US010236921B1

(12) United States Patent
Kohlhepp

(10) Patent No.: US 10,236,921 B1
(45) Date of Patent: Mar. 19, 2019

(54) SIGNAL BOOSTER DEVICE, A MEANS OF TRANSPORTATION COMPRISING A SIGNAL BOOSTER DEVICE AND A METHOD FOR OPERATING A SIGNAL BOOSTER DEVICE

(71) Applicant: KATHREIN Automotive GmbH, Hildesheim (DE)

(72) Inventor: Steffen Kohlhepp, Rosenheim (DE)

(73) Assignee: Kathrein Automotive GmbH, Hildesheim (DE)

( * ) Notice: Subject to any disclaimer, the term of this patent is extended or adjusted under 35 U.S.C. 154(b) by 0 days.

(21) Appl. No.: 15/994,081

(22) Filed: May 31, 2018

(51) Int. Cl.
| | |
|---|---|
| *H04B 7/155* | (2006.01) |
| *H04B 7/26* | (2006.01) |
| *H04B 1/04* | (2006.01) |
| *H01Q 1/24* | (2006.01) |
| *H04W 72/04* | (2009.01) |
| *H01Q 1/32* | (2006.01) |
| *H04B 7/15* | (2006.01) |

(52) U.S. Cl.
CPC .......... *H04B 1/0458* (2013.01); *H01Q 1/246* (2013.01); *H01Q 1/3291* (2013.01); *H04B 7/15* (2013.01); *H04B 7/15535* (2013.01); *H04B 7/2606* (2013.01); *H04W 72/042* (2013.01); *H04W 72/0413* (2013.01)

(58) Field of Classification Search
CPC ................ H04B 1/0458; H04B 7/2606; H04B 7/15535; H04B 7/15; H04W 72/0413; H04W 72/042; H01Q 1/246; H01Q 1/3291
See application file for complete search history.

(56) References Cited

U.S. PATENT DOCUMENTS

2005/0227619 A1* 10/2005 Lee .................... H04B 7/15578
 455/22
2011/0256826 A1* 10/2011 Ode ................... H04B 7/15535
 455/7

(Continued)

OTHER PUBLICATIONS

"Signal Boosters", Electronic Code of Federal Regulations, Title 47, Chapter I, Subchapter B, Part 20, §20.2, retrieved Feb. 11, 2015, 10 pages.

(Continued)

*Primary Examiner* — Dominic E Rego
(74) *Attorney, Agent, or Firm* — Nixon & Vanderhye P.C.

(57) ABSTRACT

A signal booster device comprises a first antenna for communicating with a mobile and a second antenna for communicating with a base station. A signal path connects the antennas to each other. The signal booster device comprises a downlink amplifier, an uplink amplifier and a first downlink power detector for detecting a downlink signal power. The signal booster device comprises a bypass line for directly electrically connecting the first antenna to the second antenna and a control unit configured to obtain a measurement value from the first downlink power detector. The control unit is configured to enable the bypass line if the measurement value of the downlink signal power oversteps a first limit value so that the signal booster device switches from normal operation mode into bypass mode. The downlink amplifier and the uplink amplifier are electrically disconnected from the respective first antenna and second antenna if the bypass line is enabled.

28 Claims, 11 Drawing Sheets

(56) References Cited

U.S. PATENT DOCUMENTS

| | | | |
|---|---|---|---|
| 2011/0280138 A1* | 11/2011 | Terry | H04B 7/15535 |
| | | | 370/252 |
| 2018/0041234 A1* | 2/2018 | Klopfer | H04B 1/0458 |
| 2018/0138967 A1* | 5/2018 | Ashworth | H04B 7/15535 |
| 2018/0219609 A1* | 8/2018 | Ashworth | H04B 1/0057 |

OTHER PUBLICATIONS

"Wideband Consumer Signal Booster Compliance Measurement Guidance" Federal Communications Commission, Office of Engineering and Technology Laboratory, Feb. 12, 2016, 36 pages.

* cited by examiner

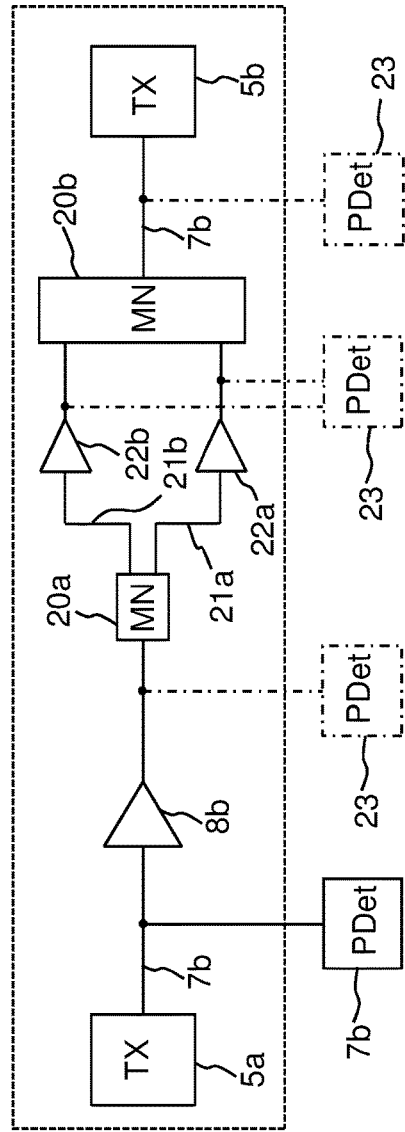
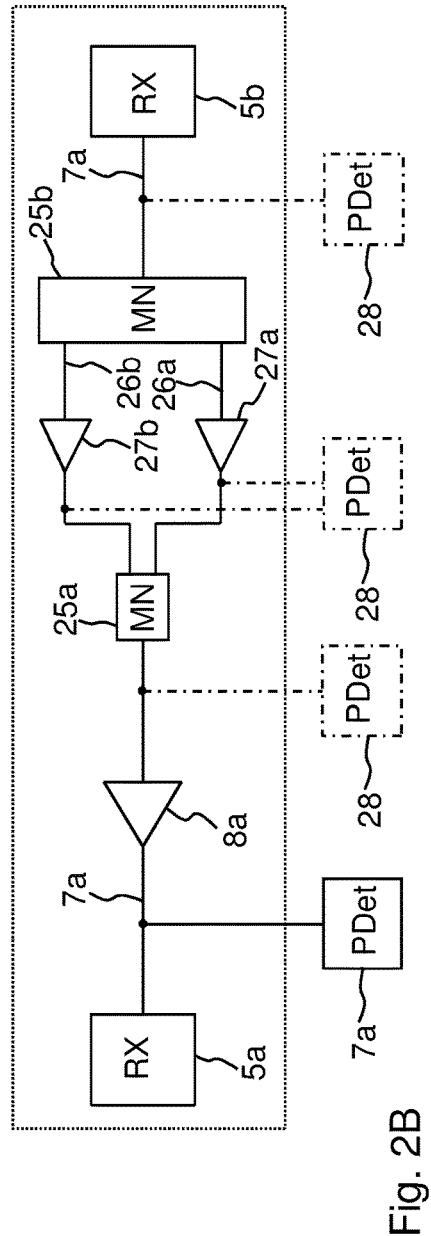
Fig. 2A
Fig. 2B

SIGNAL BOOSTER DEVICE, A MEANS OF TRANSPORTATION COMPRISING A SIGNAL BOOSTER DEVICE AND A METHOD FOR OPERATING A SIGNAL BOOSTER DEVICE

STATEMENT REGARDING FEDERALLY SPONSORED RESEARCH OR DEVELOPMENT

None.

FIELD

The technology herein relates to a booster amplifier for mobile communication and especially to a method for operating such a booster amplifier.

BACKGROUND

A booster amplifier is used to amplify wireless communication signals. More particular, a signal booster is a device that automatically receives, amplifies, and retransmits on a bidirectional or unidirectional basis, the signals received from base, fixed, mobile, or portable stations, with no change in frequency or authorized bandwidth.

Such signals boosters are used in transport vehicles like cars, trains and so on. However, the use of signal boosters is not limited to transport vehicles. They can also be used within buildings for example. Signal boosters comprise a first antenna and a second antenna, wherein the first antenna is arranged within the transport vehicle and wherein the second antenna is arranged at the outside of the transport vehicle. The first antenna is used for sending and receiving communication signals to and from a mobile, wherein the second antenna is used for sending and receiving communication signals to and from a base station. Thus, the mobile is connected to the base station through the signal booster. It is very advantageous that the transmit power of the mobile is far below of its maximum transmit power, whereby it is still ensured at the same time that a stable connection is established between the mobile and the base station. This connection is independent of any influence from an electromagnetic shielding the transport vehicle may comprise.

In general, a repeater is also some kind of signal booster. However, a repeater is able to amplify a signal with a much higher gain than a signal booster.

Unfortunately, it is possible that the use of a signal booster disrupts cellular systems. This disruption may not be limited to the network the signal booster uses, but could also be spread to other neighboring networks. A power overload situation may occur. In a result, other devices may be disconnected. A signal booster may also increase the noise floor, which decreases the sensitivity of the base station and therefore reduces the covered area for all devices. This could also result in a poor reception by the base station inhibiting a mobile to establish a communication at all.

Among the provisions to prevent these malfunctions too much noise should be avoided. In order to obtain an approval for operating a booster device, the FCC (Federal Communication Commission) has issued guidelines that any booster device has to comply with. Reference is made to FCC Title 47, Chapter I, Subchapter B, Part 20, § 20,21 (Signal boosters) dated Feb. 11, 2015 which is herein incorporated by reference.

The FCC demands that a signal booster device has to meet the noise and gain limits. Otherwise it must operate in a "Transmit Power Off Mode" in which at least the uplink amplifier is deactivated (i.e. powered off). In that case, the uplink amplifier has an attenuation of more than 30 dB. If the signal booster device is installed in a vehicle the attenuation based on materials used in the bodywork of the vehicle is high but normally less than 30 dB. As such, the mobile therefore communicates directly with the base station.

Therefore, the problem addressed herein is that of describing and/or creating a signal booster device and a method for fulfilling the FCC requirements with respect to signal boosters in a reliable and repeatable manner, wherein a stable communication link should still be provided even if the signal booster device cannot be operated in normal operation mode due to too much noise.

SUMMARY

This problem is accomplished with respect to a signal booster device and a method for operating a signal booster device. Furthermore a means of transportation is shown comprising such a signal booster device. Advantageous non-limiting implementations of the signal booster device are provided in the depending claims.

The signal booster device is used for amplifying signals in a wireless communication network. Therefore, the signal booster device comprises at least one first antenna for communicating with a mobile and at least one second antenna for communicating with a base station. The signal booster device also provides a signal path for electrically connecting the at least one first antenna to the at least one second antenna for transmitting uplink and downlink signals. The signal path is split up at least partly into a first downlink signal path and into a first uplink signal path. In addition, the signal booster device comprises at least one downlink amplifier for amplifying a downlink signal and at least one uplink amplifier for amplifying an uplink signal. The at least one downlink amplifier is arranged in the first downlink signal path and the at least one uplink amplifier is arranged in the first uplink signal path. The signal booster device also comprises at least one first downlink power detector for detecting a downlink signal power. The signal booster device further comprises a bypass line for electrically connecting the at least one first antenna directly to the at least one second antenna. Also a control unit is arranged in the signal booster device and configured to obtain a measurement value from the at least one first downlink power detector. The control unit is further configured to enable the bypass line if the measurement value of the downlink signal power of the at least one first downlink power detector oversteps (exceeds) a first limit value so that the signal booster device switches from normal operation mode into bypass mode. In bypass mode the at least one downlink amplifier and the at least one uplink amplifier are electrically disconnected from the respective at least one first antenna and at least one second antenna.

It is very beneficial that the signal booster device comprises a bypass line thereby connecting the antennas directly to each other. Such a bypass line has a lesser attenuation (i.e. 4 or 5 dB) than the bodywork of the car. As a result, after deactivation of the uplink amplifier due to high noise, the signal booster device switches into bypass mode by enabling the bypass line. The mobile still transmits its signal to the at least one first antenna of the signal booster device. This antenna is now directly (i.e. without any amplifiers) electrically connected to the at least one second antenna mounted on the outside of the vehicle. By using the bypass line the attenuation of the communication signal transmitted or received by the mobile is smaller than an attenuation based on the bodywork of the vehicle itself. Therefore, the base station does not get overloaded with noise and the mobile still has a "good" connection to the base station compared to all the signal booster devices available on the marked which do not use a bypass line but instead only deactivate the uplink amplifier.

Using the bypass line if the downlink signal power exceeds the first limit value also reduces the overall signal power at the at least one downlink amplifier. As a result it is possible to use cheaper low noise amplifiers as downlink amplifier which are not designed for high power levels.

According to a further aspect the signal booster device frequently checks in bypass mode whether the bypass line is still needed or whether the signal booster device can go back to normal operation mode. This is done by periodically connecting the antennas with the amplifiers again. However, such a connection is preferably only established as long as it takes to obtain a new measurement value for the downlink signal power. After obtaining the measurement value the antennas are connected again to each other through the bypass line. This is especially true if the downlink signal power is still higher than the first limit value. Alternatively, the antennas remain connected to the amplifiers if the newly obtained measurement value falls below a second limit value which can be as high as the first limit value or lower than the first limit value. In general, if the signal booster device is in bypass mode the time the antennas are connected again to the amplifiers for obtaining new measurement results is shorter than the time the antennas are connected to each other by using the bypass line.

According to another aspect the first uplink signal path and/or the first downlink signal path are split up in at least two uplink and/or at least two downlink branches. Whereas the first uplink signal path and the first downlink signal path can be used to transmit communication signals belonging to different mobile communication bands, only one mobile communication band is transmitted through each of the respective branches. Within each branch an additional amplifier is arranged thereby allowing that different mobile communication bands are amplified differently from each other.

According to a further aspect the signal path is also split up into a second downlink signal path and into a second uplink signal path. The first uplink and downlink paths are used for providing a signal path for a low band thereby allowing different mobile communication bands of the low band to be transmitted. The second uplink and downlink paths are used for providing a signal path for a high band thereby allowing different mobile communication bands of the high band to be transmitted. The differentiation between a low band and a high band is very beneficial, because the mobile communication bands belonging to the same low band or high band can be amplified together thereby achieving better results.

Furthermore, a means for transportation is also described herein. The means of transportation comprises a signal booster device as described above, wherein the at least one first antenna is arranged within (inside) the means of transportation and wherein the at least one second antenna is arranged on the outside of the means of transportation. The means for transportation could be but is not limited to a vehicle, a ship, a train or a plane.

Last but not least, a method for amplifying signals in a signal booster device is also described. The signal booster device comprises at least one first antenna for communicating with a mobile and at least one second antenna for communicating with a base station. The signal booster device thereby provides a signal path for electrically connecting the at least one first antenna to the at least one second antenna for transmitting uplink and downlink signals. The signal booster device also comprises at least one downlink amplifier for amplifying a downlink signal and at least one uplink amplifier for amplifying an uplink signal. The signal booster device comprises at least one first downlink power detector for detecting a downlink signal power. In addition, the signal booster device comprises a bypass line for electrically connecting the at least one first antenna directly to the at least one second antenna. The signal booster device further comprises a control unit configured to obtain a measurement value from the at least one first downlink power detector, wherein the control unit is configured to enable and disable the bypass line. The method comprises the following steps for amplifying signals in a signal booster device:

obtaining a measurement value from the at least one first downlink power detector, determining whether the measurement value of the at least one first downlink power detector oversteps a first limit value, switching from normal operation mode into bypass mode if the measurement value of the at least one first downlink power detector oversteps the first limit value, thereby electrically disconnecting the at least one downlink amplifier and the at least one uplink amplifier from the respective at least one first antenna and at least one second antenna.

Various non-limiting embodiments are described in detail below as examples with reference to the drawings. Objects which are the same have the same reference numbers.

BRIEF DESCRIPTION OF THE DRAWINGS

The following detailed description of exemplary non-limiting illustrative embodiments is to be read in conjunction with the drawings of which:

FIGS. 2A and 2B: show different block diagrams of an embodiment of a first uplink signal path and a first downlink signal path;

DETAILED DESCRIPTION OF EXAMPLE NON-LIMITING EMBODIMENTS

Figure 1A:
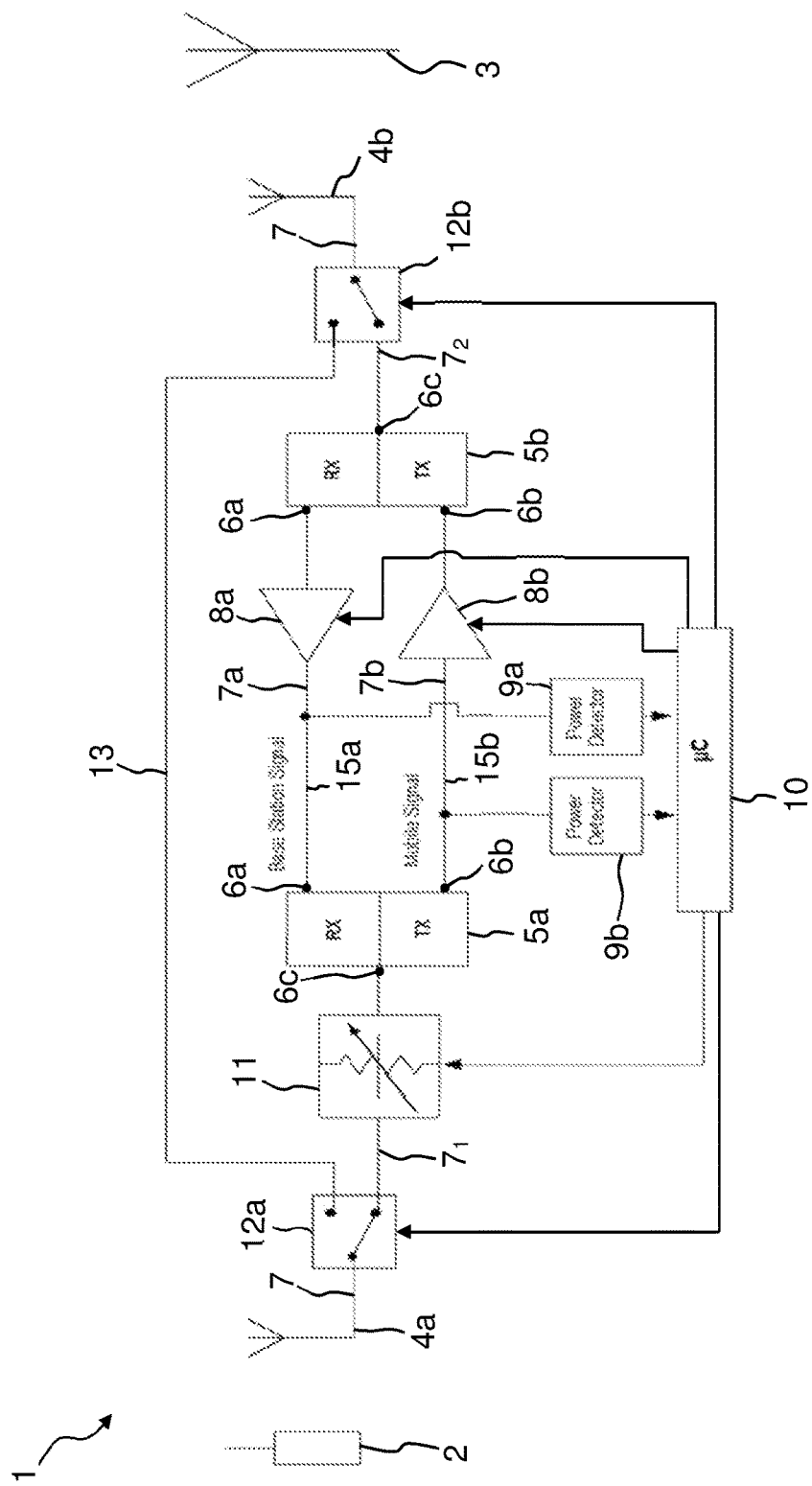
FIGS. 1A-1D: show block diagrams of a signal booster device according to various embodiments of the present invention.

FIG. 1A shows a block diagram of an embodiment of a signal booster device 1. The signal booster device 1 is used to connect one or more mobiles 2 to a base station 3. The signal booster device 1 is configured to receive a communication signal from the base station 3 and/or from the mobile 2 and to retransmit this communication signal to the mobile 2 and/or to the base station 3. The signal booster device 1 is also able to amplify the respective communication signal.

During normal operation, the gain of the signal booster device 1 is preferably constant over a respective time period, i.e. several second or minutes or hours. The signal strength of the uplink signal received by the base station 3 is thereby controlled by the mobile 2 since the amplification through the signal booster device 1 is more or less constant.

In another embodiment the signal booster device 1 is used within a means of transportation like a vehicle, a train, a ship or a plane.

The signal booster device 1 comprises at least one first antenna 4a and at least one second antenna 4b. The at least one first antenna 4a is used for establishing a communication link between the signal booster device 1 and the mobile 2. The at least one first antenna 4a is connected to an input port (not shown) of the signal booster device 1.

The at least one second antenna 4b is used for establishing another communication link between the signal booster device 1 and the base station 3. The at least one first antenna 4a is preferably arranged within the means of transportation. This means that the at least one first antenna 4a is arranged within the vehicle, the train, the ship or the plane and is able to cover the inside area of the means of transportation.

On the contrary thereto, the at least one second antenna 4b is preferably arranged outside of the means of transportation. For example the at least one second antenna 4b may be mounted on the roof of the vehicle, the train, the ship or the plane but not limited thereto. Having the signal booster device 1 installed in such a way the mobile 2 inside the means of transportation may easily connect to the base station 3. In this case the mobile 2 does not amplify its signals even close to a maximum.

The at least one first antenna 4a and the mobile 2 are further closely arranged together. Preferably, the at least one first antenna 4a is mounted in a center console or a dashboard of the vehicle. More preferably, the at least one first antenna 4a is mounted in a cradle within the means of transportation which is used to hold the mobile 2. Thus, the attenuation between the mobile 2 and the at least one first antenna 4a depends on the arrangement between the mobile 2 and the at least one first antenna 4a. A galvanic connection between the mobile 2 and the at least one first antenna 4a could also be possible. This could be achieved by a coaxial cable for example.

On the other hand the at least one second antenna 4b may be arranged in an elevated position on the means of transportation. So it is assured that the communication link between the at least one second antenna 4b and the base station 3 is secured. Even if the means of transportation comprises an outer wall which is impermeable to electromagnetic radiation the mobile 2 can still communicate with the respective base station 3. Even if the signal transmitted through the at least one second antenna 4b is highly amplified, a user within the means of transportation will not be influenced by the high powered radio frequency field.

It would also be possible to use a plurality of first antennas 4a and/or second antennas 4b. In this case the signal booster device 1 could support MIMO (multiple input multiple output) operation.

The signal booster device 1 also provides a signal path 7 for electrically connecting the at least one first antenna 4a to the at least one second antenna 4b. As a result, the mobile 2 can transmit an uplink signal to the base station 3 and can also receive a downlink signal from the base station 3.

The signal path 7 is therefore split up at least partly into a first downlink signal path 7a and into a first uplink signal path 7b. The signal booster device 1 also comprises at least one downlink amplifier 8a for amplifying a downlink signal and at least one uplink amplifier 8b for amplifying an uplink signal. Preferably at least the downlink amplifier 8a or both amplifiers 8a, 8b are low noise amplifiers.

The at least one downlink amplifier 8a is arranged in the first downlink signal path 7a. The at least one uplink amplifier 8b is arranged in the first uplink signal path 7b. The signal booster device 1 also comprises at least one first downlink power detector 9a for detecting a downlink signal power. The signal booster device 1 also comprises a control unit 10 configured to obtain a measurement value from the at least one first downlink power detector 9a.

As can be seen, the signal booster device 1 also comprises a bypass line 13 for electrically connecting the at least one first antenna 4a directly to the at least one second antenna 4b.

In non-limiting embodiments herein, the control unit 10 is configured to enable (activate) the bypass line 13 if the measurement value of the downlink signal power of the at least one first downlink power detector 9a oversteps (exceeds) a first limit value so that the signal booster device 1 switches from normal operation mode into bypass mode. This means that the at least one downlink amplifier 8a and the at least one uplink amplifier 8b are electrically disconnected from the respective at least one first antenna 4a and the at least one second antenna 4b. Both amplifiers may still be powered but it is also possible that the power to both amplifiers 8a, 8b is reduced or switched off.

It is very beneficial that the measurement value of the downlink signal power indicating whether the noise exceeds a threshold established by the standards of the cellular industry is exceeded or not. During testing of the signal booster device 1 (or of a reference model) it can be found out how high the noise level is with regards to the downlink signal power of a downlink signal at a donor port of the signal booster device 1. The donor port of the signal booster device 1 is that port the at least one second antenna 4b is connected to.

After the threshold value for the downlink signal power has been determined, the first limit value can be set to that threshold value (i.e. during production) so that after overstepping the first limit value the bypass line 13 is enabled. As a result an uplink and a downlink noise power is avoided that exceeds −70 dBm/MHz. It is also avoided that both the uplink and the downlink gain exceeds the lesser of 23 dB or MSCL, wherein MSCL (mobile station coupling loss) is the minimum coupling loss in dB between the mobile 2 and the input port of the signal booster device 1. MSCL is calculated or measured for each band of operation. MSCL also includes the path loss from the mobile 2 and the antenna gain and the cable loss of the signal booster device 1.

The signal booster device 1 also comprises a first frequency division unit 5a and a second frequency division unit 5b. The first and the second frequency division 5a, 5b units may be in form of a duplexer 5a, 5b. They may also be called a diplexer. Each of the first frequency division unit 5a and second frequency division unit 5b has a first downlink port 6a, a first uplink port 6b and a common connecting port 6c.

The at least one first antenna 4a is electrically connected to the common connecting port 6c of the first frequency division unit 5a through a first part 7₁ of the signal path 7. The at least one second antenna 4b is connected to the common connecting port 6c of the second frequency division unit 5b through a second part 7₂ of the signal path 7. The first part 7₁ of the signal path 7 is split up into the first downlink signal path 7a and into the first uplink signal path 7b by the first frequency division unit 5a. The first downlink signal path 7a is connected to the first downlink port 6a of the first frequency division unit 5a and the first uplink signal path 7b is connected to the first uplink port 6b of the first frequency division unit 5a.

The second part $7_2$ of the signal path 7 is split up into a first downlink signal path 7a and into a first uplink signal path 7b by the second frequency division unit 5b, wherein the first downlink signal path 7a is connected to the first downlink port 6a of the second frequency division unit 5b and wherein the first uplink signal path 7b is connected to the first uplink port 6b of the second frequency division unit 5b.

A first downlink electrical line 15a electrically connects the first downlink port 6a of the first frequency division unit 5a to the first downlink port 6a of the second frequency division unit 5b thereby providing the first downlink signal path 7a.

A first uplink electrical line 15b electrically connects the first uplink port 6b of the first frequency division unit 5a to the first uplink port 6b of the second frequency division unit 5b thereby providing the first uplink signal path 7b.

The at least one first downlink power detector 9a is placed in or connected/coupled to the first downlink path 7a.

If the signal booster device 1 operates in bypass mode the first and second frequency division units 5a, 5b are electrically disconnected from the respective at least one first and second antenna 4a, 4b.

For doing so the signal booster device 1 comprises a first switching circuit 12a and a second switching circuit 12b. Each of the first and second switching circuits 12a, 12b has a common connecting port and at least a first and a second connecting port. On the one hand each of the first and second switching circuits 12a, 12b is configured to electrically connect the respective common connecting port to the respective first connecting port in a first switching state. On the other hand, each of the first and second switching circuits 12a, 12b is configured to electrically connect the respective common connecting port to the respective second connecting port in a second switching state.

The common connecting port of the first switching circuit 12a is electrically connected to the at least one first antenna 4a and the common connecting port of the second switching circuit 12b is electrically connected to the at least one second antenna 4b.

The first connecting port of the first switching circuit 12a is electrically connected to the common connecting port 6c of the first frequency division 5a unit and the first connecting port of the second switching circuit 12b is electrically connected to the common connecting port 6c of the second frequency division unit 5b.

The second connecting port of the first switching circuit 12a is electrically connected to the second connecting port of the second switching circuit 12b by using the bypass line 13.

The control unit 10 is electrically connected to the first and second switching circuit 12a, 12b and configured to control the first and second switching circuits 12a, 12b in such a way that the first and second switching circuits 12a, 12b switch between the first switching state and the second switching state.

As mentioned above, the antennas 4a, 4b are connected directly to each other by using the bypass line 13 if the downlink signal power exceeds the first limit value. The first limit value is set to such a value for example that the bypass line 13 is enabled (both switching circuits 12a, 12b switch to the second switching state) before the uplink and downlink noise power exceeds −70 dBm/MHz and before the uplink and downlink gain exceeds the lesser of 23 dB or MSCL (mobile station coupling loss).

If a test has proven that a noise power of the signal booster device 1 only exceeds the limits set by the standards of the cellular industry for high measurement values of the downlink signal power (i.e. RSSI>−15 dBm) then it might alternatively be the case that the bypass line 13 is enabled if a gain between the first connecting ports of the first and second switching circuits 12a, 12b is lower than a gain between the second connecting ports of the first and second switching circuits 12a, 12b. For a better understanding, it has to be noted that the gain of the uplink signal and the downlink signal depends on the RSSI value. The RSSI (received signal strength indication) is the downlink composite received signal power in dBm referred to the donor antenna port of the signal booster device 1 the at least one second antenna 4b is connected to. The higher the RSSI value is the more the gain of the uplink signal and the downlink signal has to be reduced.

Figure 4:
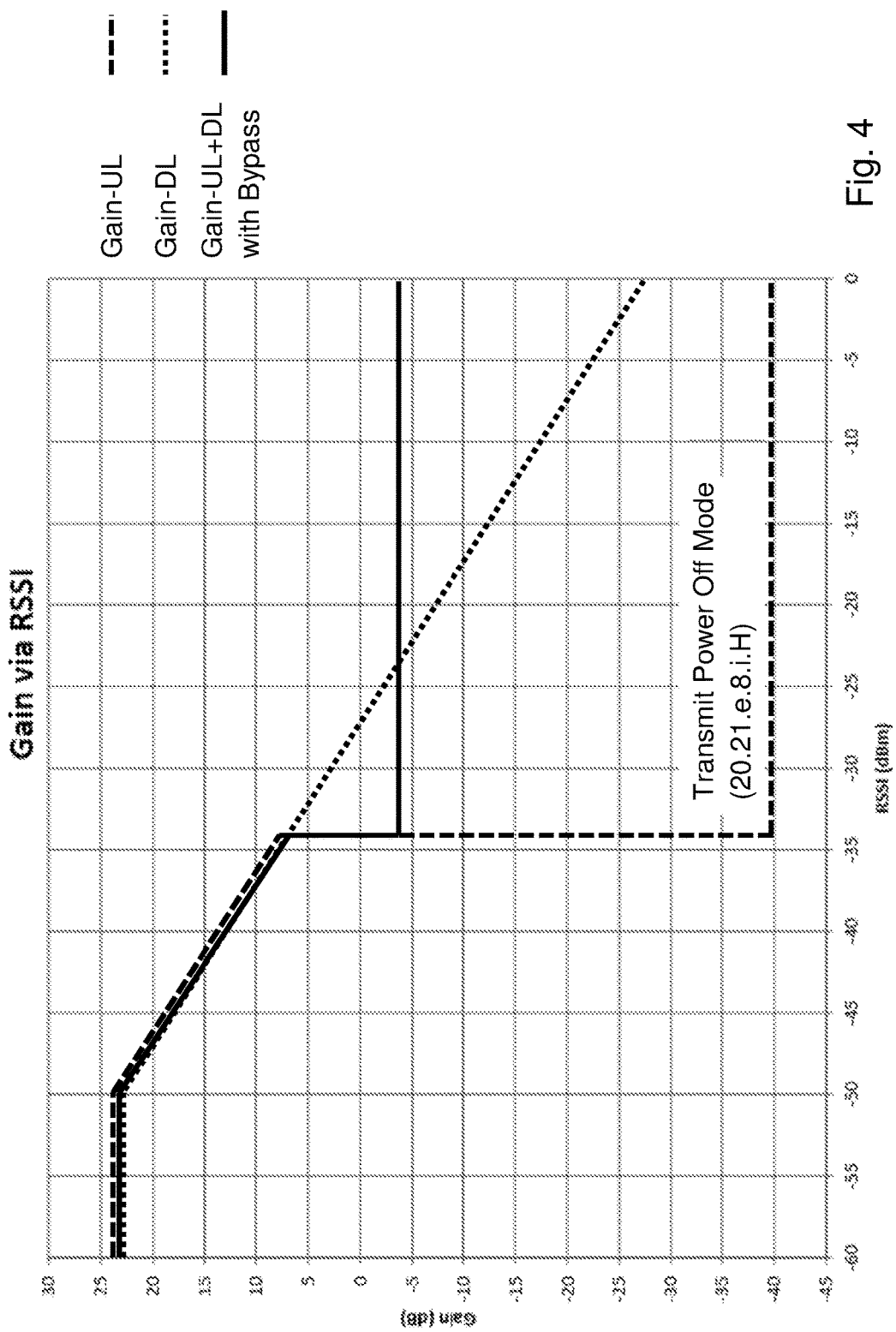
FIG. 4: shows a diagram explaining how the gain of the signal booster device is set with respect to the RSSI.

Reference is made to FIG. 4. There it is shown that the gain for the uplink signal and the downlink signal is +23 dB for an RSSI value between −60 dBm and −50 dBm. The gain of +23 dB is allowed when using a cradle for connecting the mobile 2 to the signal booster device 1. If the mobile 2 is connected directly or if no cradle but normal antennas are used the value is different.

Starting at an RSSI value of −50 dBm the gain is reduced constantly. This is true for the uplink signal and the downlink signal. This can be done for example by reducing the supply voltage of the at least one downlink amplifier 8a and the at least one uplink amplifier 8b. As explained later, at least an attenuator 11 is used preferably to attenuate the gain of the uplink and the downlink signal so that the amplification can be kept constant (amplifiers operate in the linear range).

Still referring to FIG. 4 it can be seen that the gain for the downlink signal falls below the gain of the bypass line 13 after the RSSI reaches a value of −24 dBm or higher. This will be the point in which the gain of a signal being transmitted from the mobile 2 to the base station 3 through the first and the second frequency division units 5a, 5b and the uplink amplifier 8b would be attenuated more than a signal being transmitted from the mobile 2 to the base station 3 through the bypass line 13. In that case it is preferred to control the first and the second switching circuits 12a, 12b so that they switch from the first switching state to the second switching state thereby enabling the bypass line 13.

In the example of FIG. 4 the gain of the uplink signal drops from +7 dB to −40 dB if the RSSI reaches a value of −34 dBm. In that specific example the uplink amplifier 8b is deactivated so that a gain of −40 dB for the uplink signal is established. In the specific example 1 this is done because the uplink and downlink noise power exceeds −70 dBm/MHz after the RSSI value reaches −34 dBm. As a result the signal booster device of the state of the art would activate the transmit power off mode as indicated by the low gain at around −40 dB. Contrary to that, the signal booster device 1 would only enable the bypass line 13 resulting of a gain for the uplink and downlink signal of approximately −4 dB which is a lot better than a gain of −40 dB by disabling the uplink amplifier 8b as done by the state of the art boosters.

The formula for calculating the gain of the uplink signal and the downlink signal is:

$$-34\text{ dB}-\text{RSSI}+\text{MSCL}$$

wherein RSSI is the downlink composite received signal strength in dBm at the donor port and wherein MSCL is the minimum coupling loss between the mobile and an input port of the signal booster device the at least one first antenna is connected to.

In the example of FIG. 4, MSCL is set to 7 dB. Within the standards of the cellular industry it is explained in detail on how to measure the value of MSCL. Reference is made to appendix B of § 20.21.

After the signal booster device 1 switches from normal operation mode to bypass mode, the signal booster device 1 stays in the bypass mode as long as the measurement value of the downlink signal power provided by the at least one first downlink power detector 9a stays above the first limit value. However, the control unit 10 is also configured to control the first and the second switching circuits 12a, 12b in such a way that the first and second switching circuits 12a, 12b change from their second switching state (bypass mode) into their first switching state. This is done if the measurement value provided by the at least one first downlink power detector 9a falls below a second limit value. The second limit value may be as high as the first limit value but is preferably below the first limit value thereby prevent a frequent switching around the first limit value (hysteresis).

Figure 5:
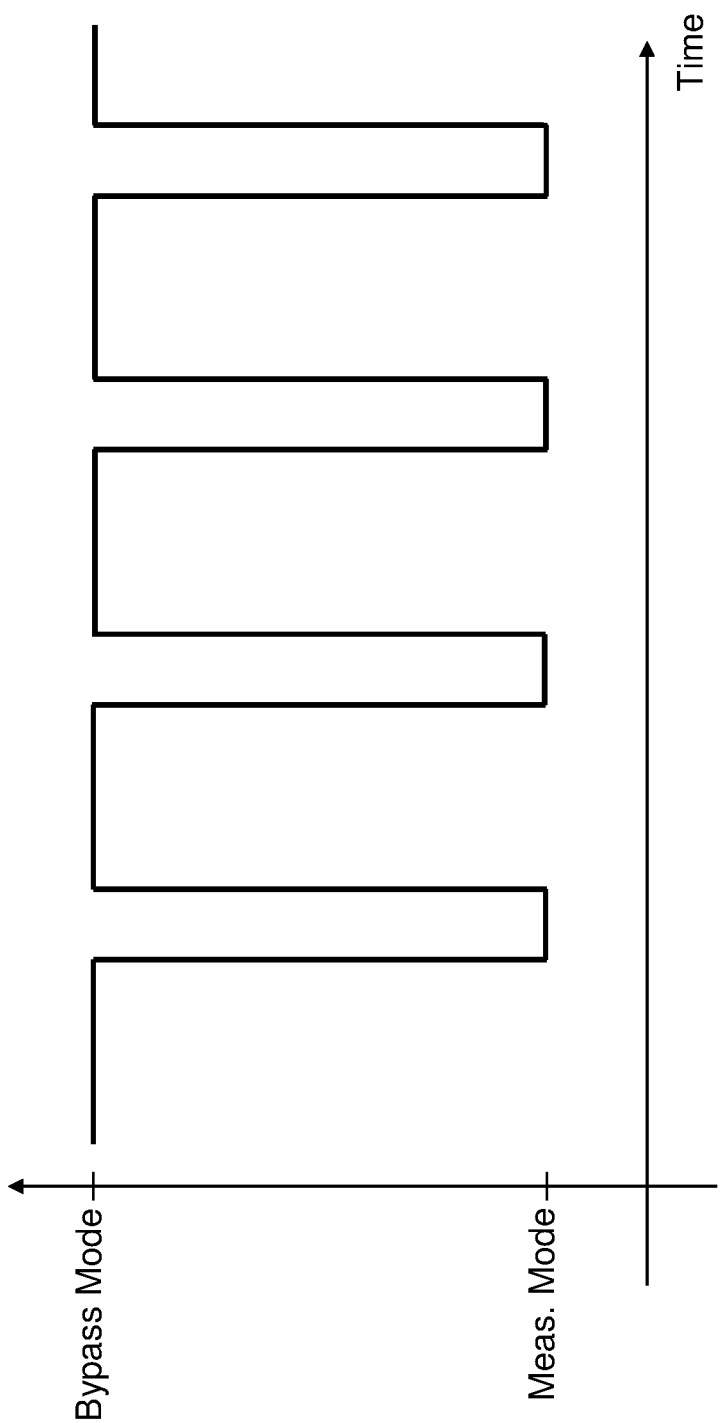
FIG. 5: shows a diagram explaining the periodical switching between the second switching state and the first switching state if the signal booster device is in bypass mode.

The control unit 10 is also configured to control the first and second switching circuits 12a, 12b during the bypass mode in such a manner that the first and second switching circuits 12a, 12b periodically switch between the second switching state (bypass mode) and the first switching state. The control unit 10 is further configured to obtain the measurement value from the at least one first downlink power detector 9a in the first switching state. Reference is made to FIG. 5.

It has also to be noted that the switching circuits 12a, 12b stay longer in the second switching state (after the bypass mode has been enabled) than in the first switching state (for obtaining measurement values). Normally, the control unit 10 is configured to control the first and second switching circuits 12a, 12b during the bypass mode in such a way that the first and second switching circuits 12a, 12b remain longer than 10-times or 20-times or 50-times or 100-times or 200-times or 500-times or 1000-times or 2000-times or 5000-times or 7000-times or 10000-times in the second switching state than in the first switching state.

The first switching state preferably lasts longer than 50 μs, 60 μs, 70 μs, 80 μs, 90 μs, 100 μs, 120 μs, 140 μs, 160 μs, 180 μs or 200 μs but less than 500 μs, 400 μs, 300 μs, 200 μs or 150 μs.

Figure 1B:
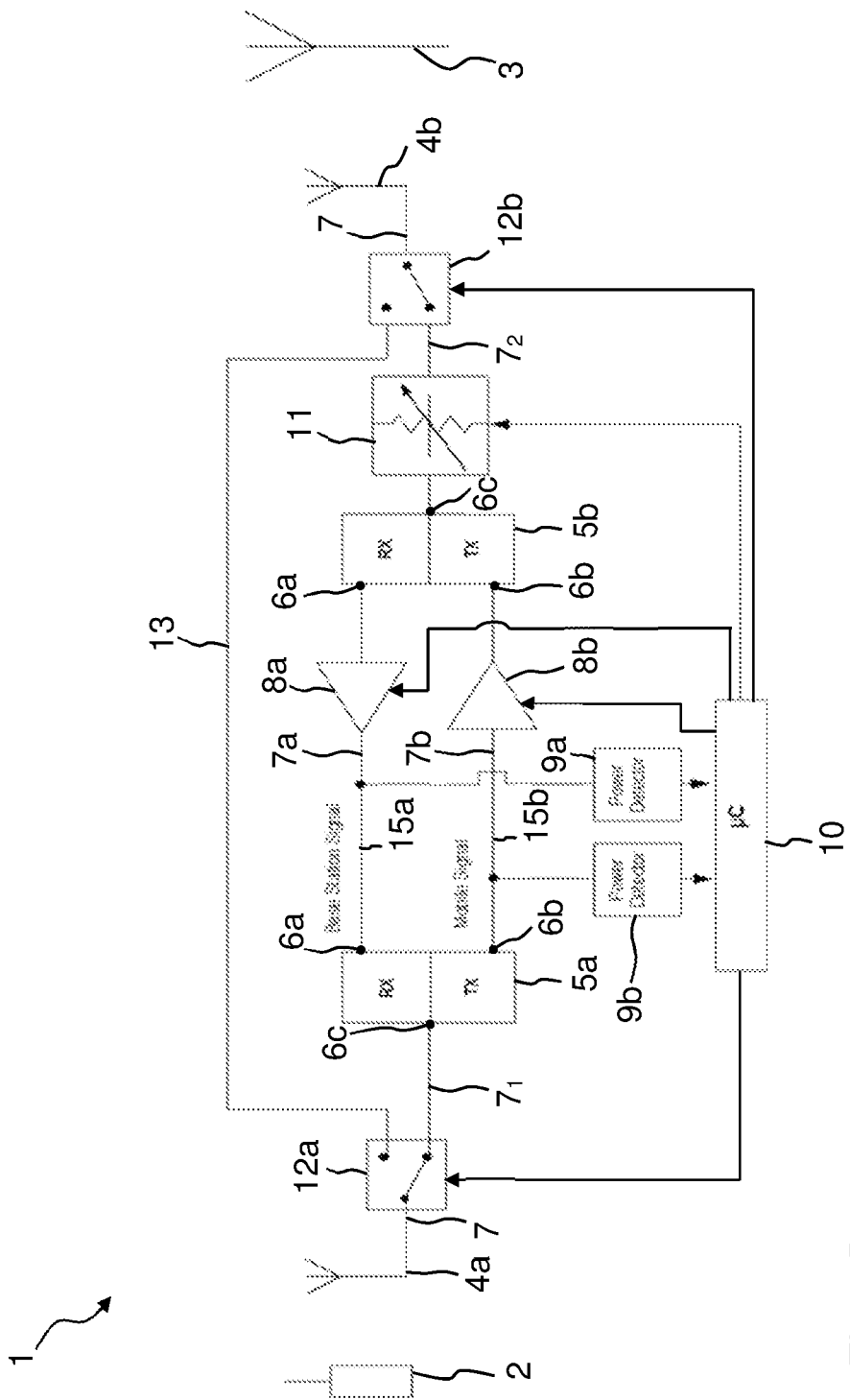

As previously mentioned the signal booster device 1 also comprises at least one first attenuator 11. The at least one first attenuator 11 is preferably arranged between the first connecting ports of the first and second switching circuits 12, 12b. More precisely, the at least attenuator 11 is arranged between the first connecting port of the first switching circuit 12a and the common connecting port 6c of the first frequency division unit 5a. This is shown in FIG. 1A. It could also be possible that the at least one first attenuator 11 is arranged between the first connecting port of the second switching circuit 12b and the common connecting port 6c of the second frequency division unit 5b. This is shown in FIG. 1B. It is also possible that two attenuators 11 are used, wherein one attenuator 11 is arranged between the first switching circuit 12a and the first frequency division unit 5a and wherein the second attenuator 11 is arranged between the second switching circuit 12b and the second frequency division unit 5b. This embodiment is shown in FIG. 1C.

The control unit 10 is electrically connected to the at least one first attenuator 11 and configured to control the attenuation factor of the at least one first attenuator 11. The attenuation can preferably be changed stepwise or continuously.

Figure 1C:
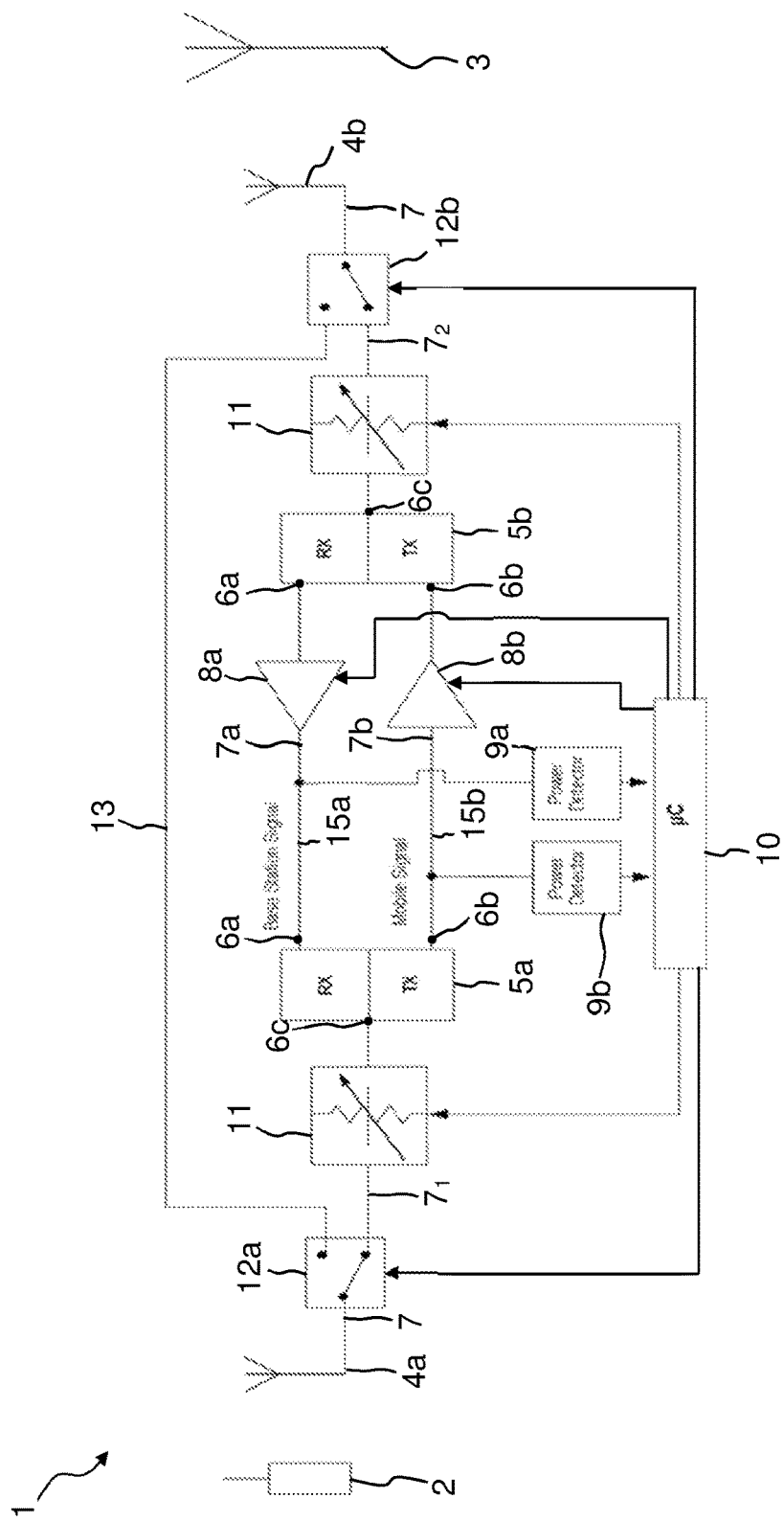

Regarding FIGS. 1A to 1C the at least one first attenuator 11 is arranged within the first part $7_1$ of the signal path 7 and/or within the second part $7_2$ of the signal path 7. Therefore the uplink and downlink signals are attenuated equally during normal operation.

The at least one first attenuator 11 is not only used to ensure that the uplink and downlink gain remain within the limits set by the standards of the cellular industry (see equation above) but is also used during the bypass mode. As explained above, the control unit 10 is further configured to control the first and the second switching circuits 12a, 12b during the bypass mode in such a way that they periodically change from the second switching state to the first switching state. The control unit 10 is also configured to control the at least one first attenuator 11 during the bypass mode in such a way that the at least one first attenuator 11 is driven at least during the first switching state to at least 70% or 80% or 90% of its maximum attenuation. As a result, it is ensured that the uplink signal is attenuated in such a way during the measurement that the noise power stays within the standards of the cellular industry.

It is also possible that the attenuation of the at least one first attenuator 11 stays increased during the whole time the bypass mode occurs.

Figure 1D:
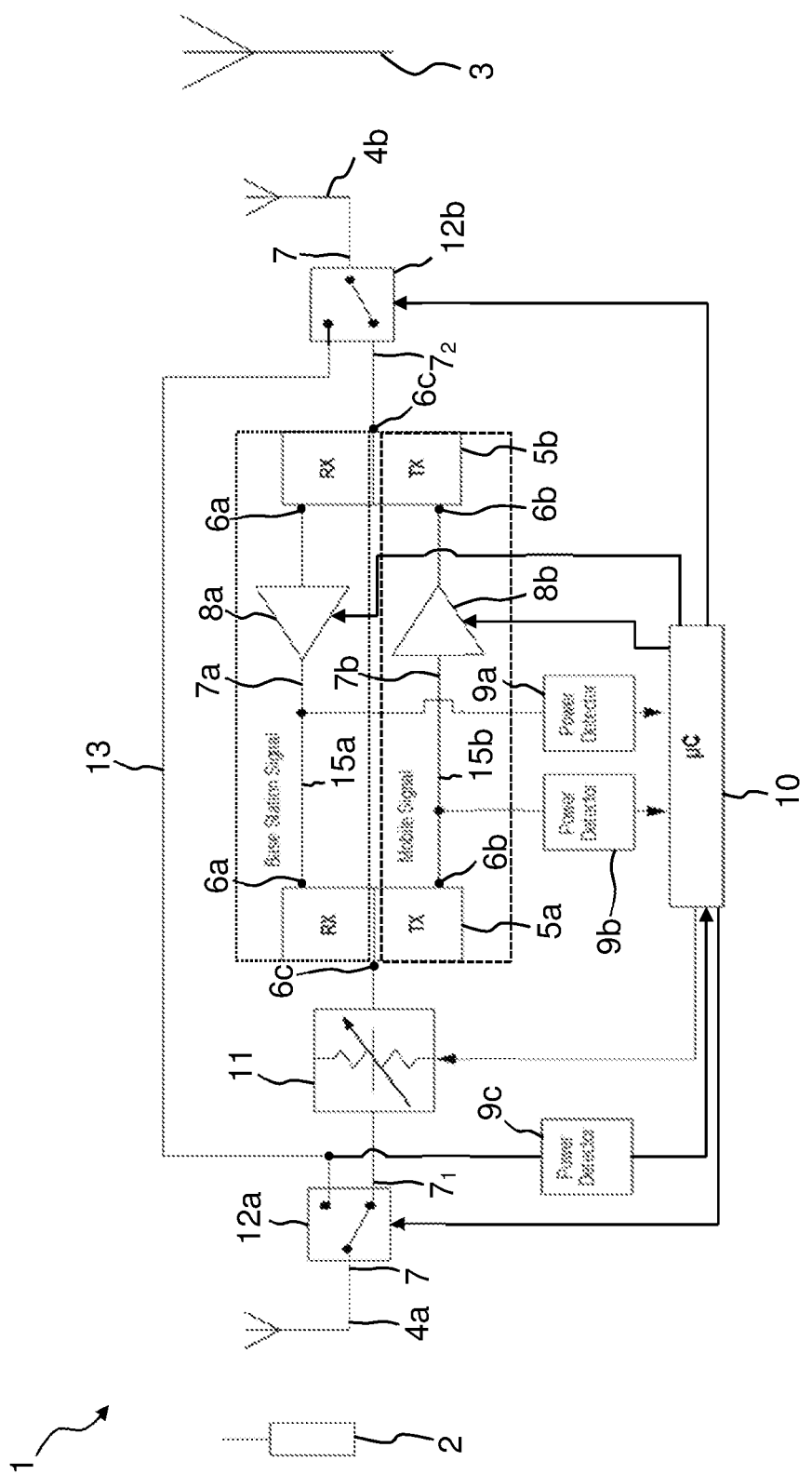

Instead of periodically switching between the second switching state and the first switching state during bypass mode, it would also be possible that the signal booster device 1 comprises a second downlink power detector 9c for detecting a downlink signal power in the bypass line 13. The control unit 10 is then configured to obtain a measurement value from the second downlink power detector 9c wherein the control unit 10 is also configured to control the first and second switching circuits 12a, 12b during the bypass mode with respect to the measurement value obtained from the second downlink power detector 9c. In order to do so a filter network should preferably be applied so that only the downlink signals are fed to or coupled to the second downlink power detector 9c. Such an embodiment is shown in FIG. 1D for example.

It has also to be noted that each of the least one downlink and uplink amplifiers 8a, 8b is configured to operate at a constant gain. As such, the control unit 10 is configured to control the attenuation factor of the at least one first attenuator 11 to maintain the output of the signal booster device 1 at the at least one second antenna 4b within the limits required by the standards of the cellular industry.

The FIGS. 1A to 1D also show that the signal booster device 1 comprises at least one first uplink power detector 9b for detecting an uplink signal power. The at least one first uplink power detector 9b is arranged in the first uplink path 7b and the control unit 10 is configured to obtain a measurement value from the at least one first uplink power detector 9b.

In the following reference is made to FIG. 1D. As can be seen the downlink signal path 7a is surrounded by a doted rectangle. Contrary to that, the uplink signal path 7b is surrounded by a dashed rectangle.

Now, reference is made to FIGS. 2A and 2B. FIG. 2A shows an exemplary embodiment of the uplink signal path 7b, wherein FIG. 2B shows an exemplary embodiment of the downlink signal path 7a. It is also to be understood that the signal booster device 1 is configured to transmit different signals corresponding to at least two different mobile communication bands (i.e. communication bands could be: 2, 4, 5, 12, 13 and/or 17). This means that the signal booster device 1 is configured to transmit two different communication signals belonging to two different communication bands after each other (i.e. the mobile 2 switches the communication band during a call (GSM to UMPTS)). It could also be possible that the signal booster device 1 transmits two communication signals belonging to two different communication bands at the same time. This could be possible if two mobiles 2 are used at the same time for example.

FIG. 2A and FIG. 2B show that communication signals belonging to different communication bands can be amplified independently from each other.

For doing so the signal booster device 1 further comprises a first and a second uplink matching network 20a, 20b arranged within the first uplink signal path 7b. The first uplink matching network 20a is connected to the first frequency division unit 5a and is configured to split the first uplink signal path 7b into at least two uplink branches 21a, 21b wherein the first uplink matching network 20a is further configured to forward each of the at least two mobile communication bands in a different branch 21a, 21b.

The second uplink matching network 20b is connected to the second frequency division unit 5b and is configured to merge the at least two uplink branches 21a, 21b back into the first uplink signal path 7b.

The first and the second matching network 20a, 20b can comprise a filter network. They can also be called a diplexer.

The signal booster device 1 further comprises at least one other uplink amplifier 22a, 22b which is arranged in each of the at least two uplink branches 21a, 21b and is configured to amplify the communication signal of the respective communication band transmitted over the respective uplink branch 21a, 21b. The at least one other uplink amplifier 22a, 22b may be configured to amplify the communication signals of the respective communication bands differently. This means that one communication band is amplified higher than the other communication band. Preferably, the different amplification is used to compensate different losses due to a different frequency.

It is also shown that the at least uplink power detector 9b can be arranged at different positions (dashed-dotted-line). It is also possible that the signal booster device 1 comprises at least one other uplink power detector 23 which is preferably arranged in each of the at least two uplink branches 21a, 21b before and/or after the respective at least one other uplink amplifier 22a, 22b. The control unit 10 is further configured to obtain a measurement value from the at least one other uplink power detector 23 in each of the at least two uplink branches 21a, 21b.

As can be seen in FIG. 2A the at least one uplink amplifier 8b is arranged in the uplink signal path 7b and configured to amplify all communication signals transmitted through the uplink signal path 7b. Therefore, the at least one uplink amplifier 8b is able to amplify communication signals of different communication bands. Contrary to that, the at least one other uplink amplifiers 22a, 22b arranged in different uplink branches 21a, 21b only amplify communication signals of a respective communication band.

Referring now to FIG. 2B the same structure is shown for the downlink signal path 7a. The signal booster device 1 is also configured to receive signals corresponding to at least two different mobile communications bands over the first downlink signal path 7a. The signal booster device 1 comprises a first and a second downlink matching network 25a, 25b arranged within the first downlink signal path 7a.

The second downlink matching network 25b is connected to the second frequency division unit 5b and is configured to split the first downlink signal path 7a into at least two downlink branches 26a, 26b, wherein the second downlink matching network 25b is further configured to forward each of the at least two mobile communication bands in a different downlink branch 26a, 26b.

The first downlink matching network 25a is connected to the first frequency division unit 5a or to the at least one downlink amplifier 8a (as shown in FIG. 2B). The first downlink matching network 25a is configured to merge the at least two downlink branches 26a, 26b back into the first downlink signal path 7a.

At least one other downlink amplifier 27a, 27b is arranged in each of the at least two downlink branches 26a, 26b and is configured to amplify the communication signal of the respective communication band received within the respective downlink branches 26a, 26b.

It can also be seen that at least one other downlink power detector 28 is arranged in each of the at least two downlink branches 26a, 26b before and/or after the respective at least one other downlink amplifier 27a, 27b. The control unit 10 is also configured to obtain a measurement value from the at least one other downlink power detector 28 in each of the at least two downlink branches 26a, 26b.

The at least one downlink amplifier 8a is configured to amplify downlink signals of different communication bands, wherein the at least one other downlink amplifier 27a, 27b is configured to amplify a communication signal of a respective communication band but not of all communication bands the signal booster device 1 is used for.

Figure 3A:
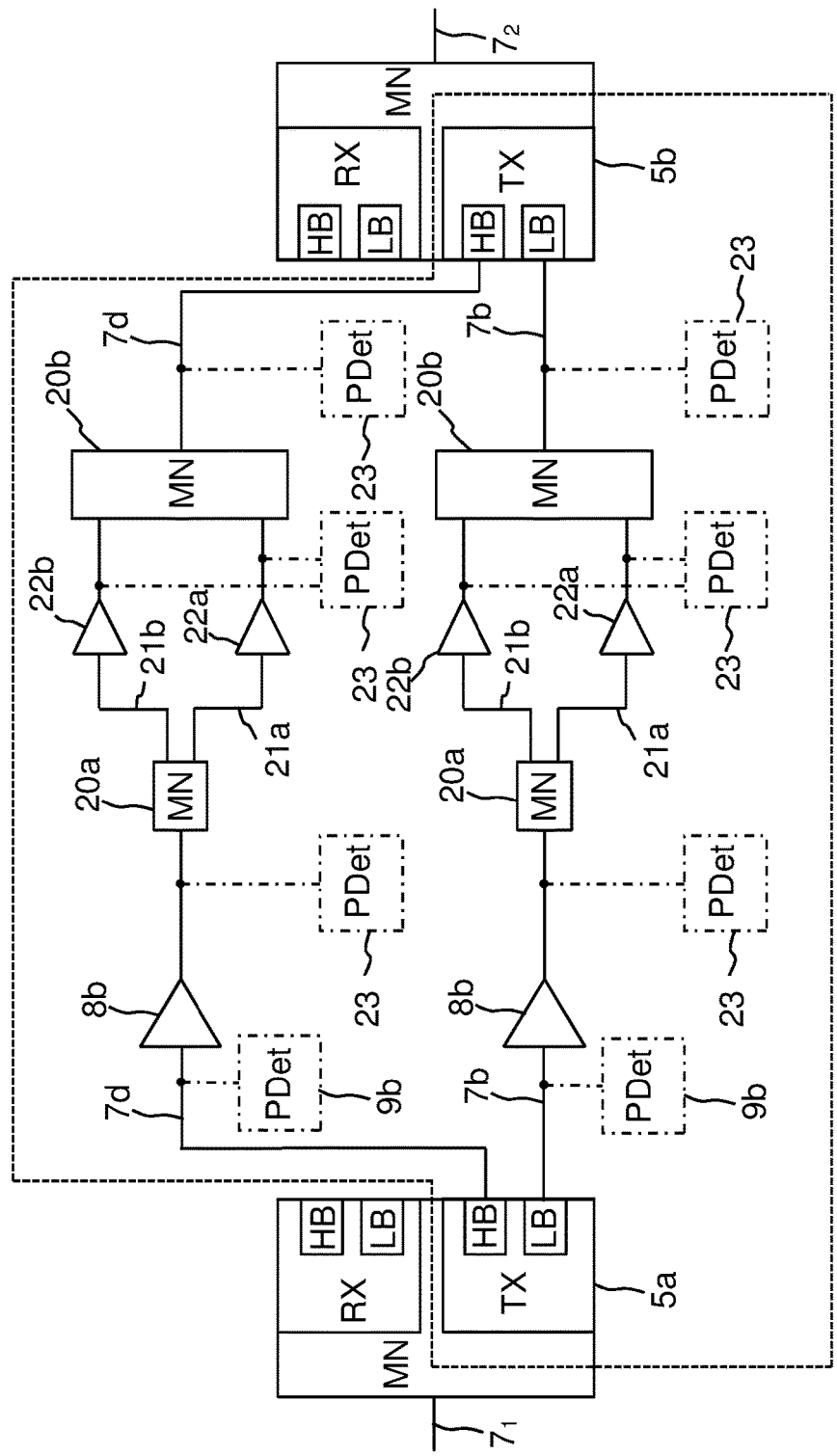
FIGS. 3A-3C: show different block diagrams of an embodiment of a first and a second uplink signal path and a first and a second downlink signal path.
Figure 3B:
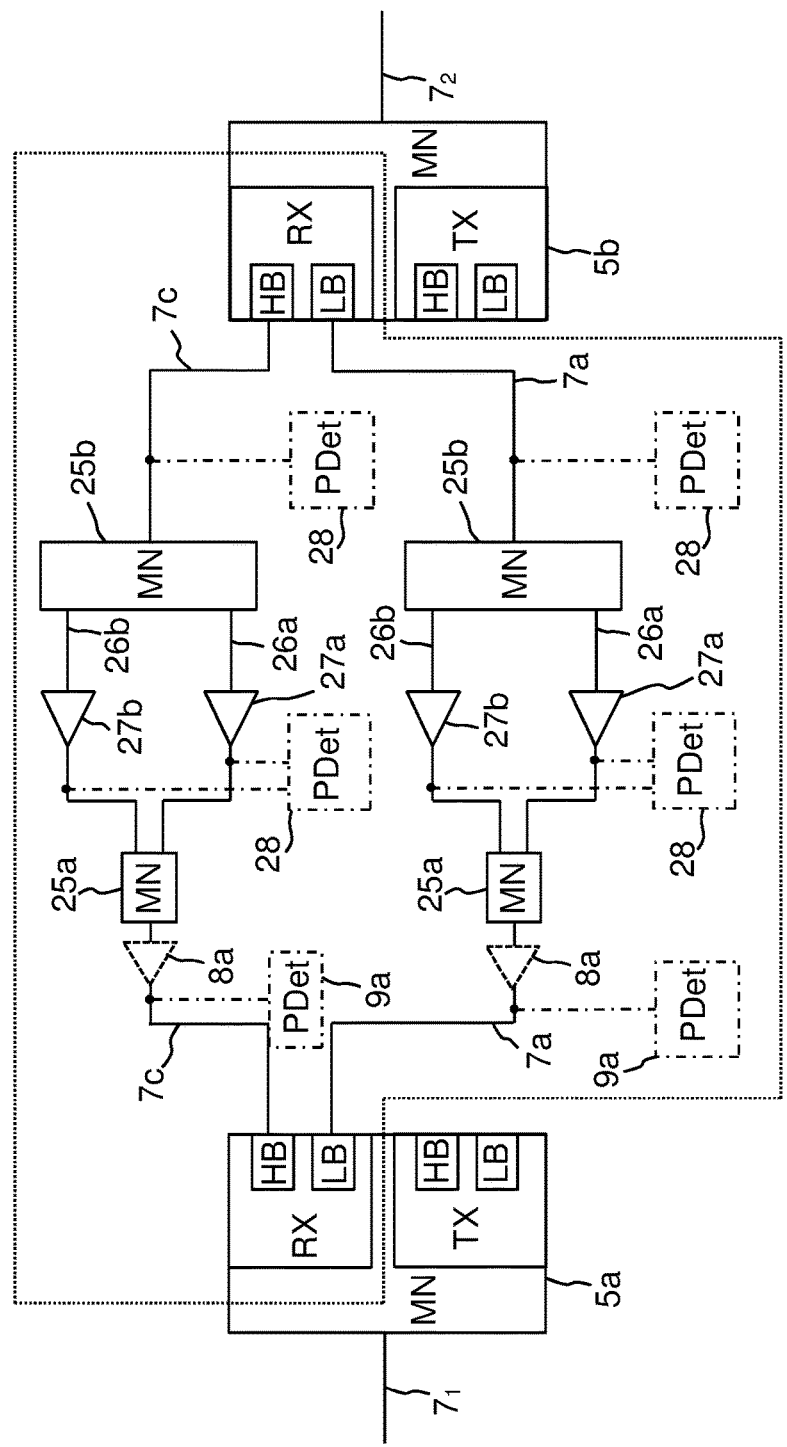
Figure 3C:
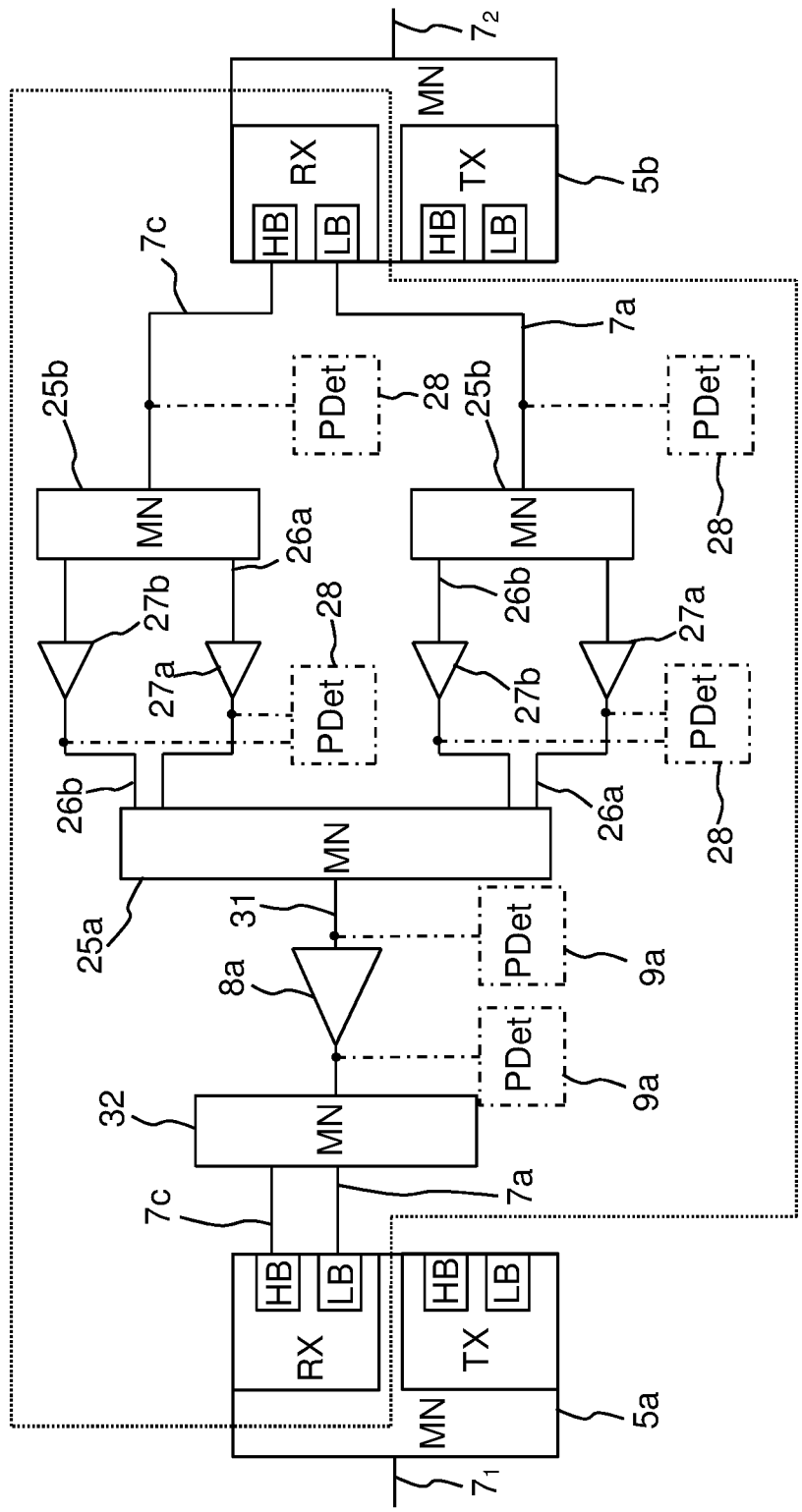

Referring now to FIGS. 3A, 3B and 3C. These figures show a signal booster device 1, wherein the first part $7_1$ of the signal path 7 is also split up into a second downlink signal path 7c (FIGS. 3B, 3C) and into a second uplink signal path 7d (FIG. 3A). This is done by the first frequency division unit 5a. The second downlink signal path 7c is connected to the second downlink port of the first frequency division unit 5a. The second uplink signal path 7d is connected to the second uplink port of the first frequency division unit 5a.

The second part $7_2$ of the signal path 7 is also split up into a second downlink signal path 7c (FIGS. 3B, 3C) and into a second uplink signal path 7d (FIG. 3A) by the second frequency division unit 5b. The second downlink signal path 7c is connected to the second downlink port of the second frequency division unit 5b and the second uplink signal path 7d is connected to the second uplink port of the second frequency division unit 5b.

The first uplink and downlink paths 7a, 7b are used for transmitting and/or receiving in a low band comprising different mobile communication bands. The low band comprises mobile communication bands preferably below 1000 MHz or below 1200 MHz or below 1400 MHz.

The second downlink and uplink paths 7c, 7d are used for transmitting and/or receiving in a high band comprising different mobile communication bands. The high band comprises mobile communications bands preferably above 1000 MHz or above 1200 MHz or above 1400 MHz.

Preferably the low band comprises the mobile communication bands 5, 12, 13, 17 and the high band comprises the mobile communication bands 2, 4. It has to be noted that the aforementioned mobile communication bands are in use in the United States. Different countries allow or require the use of different mobile communication bands.

As can be seen in FIG. 3A the first uplink signal path 7b and the second uplink signal path 7d comprise the same structure as shown in FIG. 2A. Reference is made thereto.

As for the first and second downlink signal paths 7a, 7c of FIG. 3B, they comprise the same structure as shown in FIG. 2B. However, the at least one downlink amplifier 8a is drawn with a dashed line indicating that the at least one downlink amplifier 8a is optional.

Referring now to FIG. 3C. It can be seen that the first and the second downlink signal path 7a, 7c comprise a common amplifier 8a. The first matching network 25a is configured to merge the two downlink branches 26a, 26b of the first and the second downlink signal path 7a, 7c into a single electrical line 31. Within the single electrical line 31 the common amplifier 8a is arranged. Before and/or after the common amplifier 8a the at least one first power detector 9a is arranged. Between the common amplifier 8a and the first frequency division unit 5a another matching network 32 is arranged for splitting up the single line 31 into the first downlink signal path 7a and the second downlink signal path 7c. The common amplifier 8a can also be the at least one downlink amplifier 8a.

The first and the second frequency division units 5a, 5b may comprise a first frequency divider (i.e. filter network) being configured to separate the high band from the low band. Afterwards, several duplexers can be used to separate the uplink signal paths 7b, 7d from the downlink signal paths 7a, 7c and from each other of the respective low band/high band.

The first and the second switching circuits 12a, 12b are preferably SPDT (single pole double throw) semiconductor elements.

The at least one downlink amplifier 8a and/or the at least one uplink amplifier 8b are preferably low noise amplifiers (LNAs).

The signal transmitted and amplified through the signal booster device 1 is a 2G, 3G, 4G and/or 5G signal.

2G signals are GSM, GPRS, EDGE and EDGE+ for example.

3G signals are UMTS, HSPA, HSPA+ and W-CDMA for example.

4G signals are LTE, LTE-Advanced for example.

5G signals are also supported by the signal booster device, because they use similar frequencies and power levels.

The first and/or the second frequency division units 5a, 5b could comprise a cavity filter structure.

The at least one downlink amplifier 8a and at least one uplink amplifier 8b can comprise more than one amplifier or amplifier stage. For example, it is possible that the at least one downlink amplifier 8a and at least one uplink amplifier 8b comprise a pre-amplifier and a main amplifier.

Figure 6:
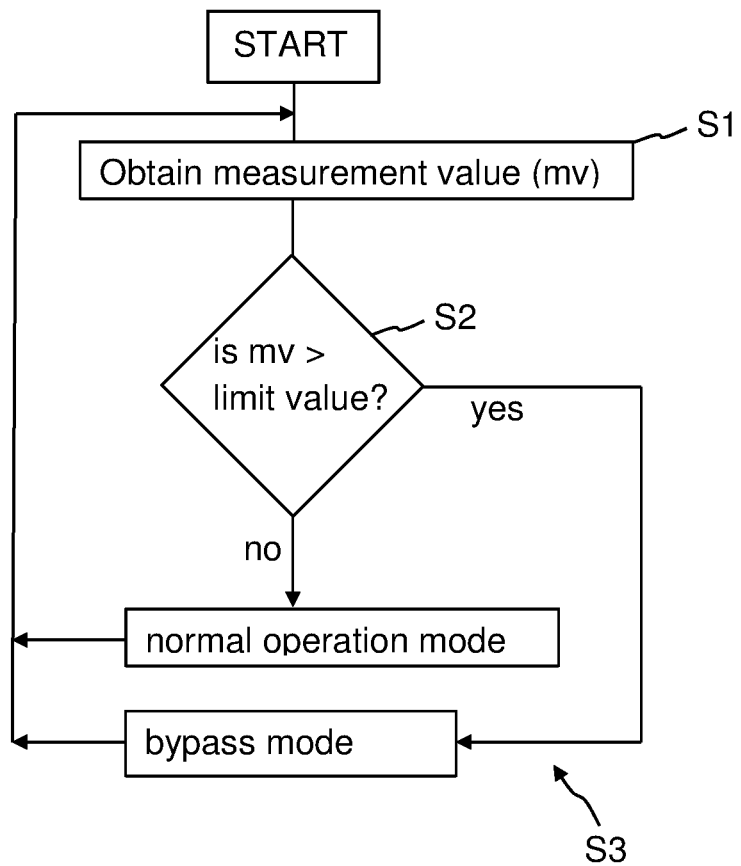
FIG. 6: shows a flow chart which explains a method for operating the signal booster device.

Referring now to FIG. 6 which shows a flow chart explaining the method for operating the signal booster device 1.

In a first step S1 a measurement value is obtained from the at least one first downlink power detector 9a. It is obvious that this measurement value can also be an already averaged value of a plurality of consecutive obtained measurement values.

In a second step S2 it is determined whether the measurement value of the at least one first downlink power detector 9a oversteps a first limit value.

In step S3 the signal booster device 1 is switched from normal operation mode into bypass mode if the measurement value of the at least one first downlink power detector 9a oversteps the first limit value, thereby electrically disconnecting the at least one downlink amplifier 8a and the at least one uplink amplifier 8b from the respective at least one first antenna 4a and the respective at least one second antenna 4b. If this is not the case, the signal booster device 1 further operates in normal operation mode.

The first and/or second frequency division units 5a, 5b can comprise separate elements (i.e. duplexers) being connected together by electrical lines. Especially for drawing reasons the first and second frequency division units 5a, 5b are only depicted by one block. However, the interpretation should comprise both variants, namely a compact built first and second frequency division unit 5a, 5b each comprising only one element for the frequency separation and a first and second frequency division unit 5a, 5b comprising more elements for the frequency separation connected together.

It is to be noted that between the first connecting ports of the first and second switching circuits 12a, 12b the at least one first attenuator 11, the first and second frequency division unit 5a, 5b, the at least one downlink amplifier 8a and the at least one uplink amplifier 8b are arranged.

It has also to be noted that after every amplifier 8a, 8b a filter (i.e. low pass filter, high pass filter, band pass filter) can be arranged. The same is also true for the various matching networks 20a, 20b, 25a, 25b, 32 used in the signal booster device 1.

Furthermore, the bypass line 13 is preferably free from any amplifying elements and/or attenuators and/or filter networks.

The invention is not limited to the described embodiments. In the context of the invention, all described and/or indicated features can be freely combined with each other.

The invention claimed is:

1. A signal booster device for amplifying signals in a wireless communication network, comprising:
   at least one first antenna for communicating with a mobile and at least one second antenna for communicating with a base station,
   the signal booster device providing a signal path for electrically connecting the at least one first antenna to the at least one second antenna for transmitting uplink and downlink signals,
   the signal path being split up at least partly into a first downlink signal path and into a first uplink signal path,
   at least one downlink amplifier for amplifying a downlink signal and at least one uplink amplifier for amplifying an uplink signal,
   the at least one downlink amplifier being arranged in the first downlink signal path, the at least one uplink amplifier being arranged in the first uplink signal path,
   at least one first downlink power detector for detecting a downlink signal power,
   a bypass line for directly electrically connecting the at least one first antenna to the at least one second antenna,
   a control unit configured to obtain a measurement value from the at least one first downlink power detector,
   the control unit being configured to enable the bypass line if the measurement value of the downlink signal power of the at least one first downlink power detector oversteps a first limit value so that the signal booster device switches from normal operation mode into bypass mode,
   the at least one downlink amplifier and the at least one uplink amplifier being electrically disconnected from the respective at least one first antenna and at least one second antenna if the bypass line is enabled.

2. The signal booster device of claim 1, wherein
the signal booster device further comprises a first frequency division unit and a second frequency division unit, each of the first frequency division unit and second frequency division unit having a first downlink port, a first uplink port and a common connecting port,
the at least one first antenna being connected to the common connecting port of the first frequency division unit through a first part of the signal path,
the at least one second antenna being connected to the common connecting port of the second frequency division unit through a second part of the signal path,
the first part of the signal path being split up into a first downlink signal path and into a first uplink signal path by the first frequency division unit, wherein the first downlink signal path is connected to the first downlink port of the first frequency division unit and wherein the first uplink signal path is connected to the first uplink port of the first frequency division unit;
the second part of the signal path being split up into a first downlink signal path and into a first uplink signal path by the second frequency division unit, wherein the first downlink signal path is connected to the first downlink port of the second frequency division unit and wherein the first uplink signal path is connected to the first uplink port of the second frequency division unit;
the device further comprises a first downlink electrical line that electrically connects the first downlink port of the first frequency division unit to the first downlink port of the second frequency division unit thereby providing the first downlink signal path, and a first uplink that electrical line electrically connects the first uplink port of the first frequency division unit to the first uplink port of the second frequency division unit thereby providing the first uplink signal path,
the at least one first downlink power detector being arranged in the first downlink path,
the first and second frequency division units being disconnected from the respective at least one first and second antenna if the bypass line is enabled.

3. The signal booster device of claim 2, wherein
the signal booster device further comprises a first switching circuit and a second switching circuit,
each of the first and second switching circuits having a common connecting port and at least a first and a second connecting port,
each of the first and second switching circuits being configured to electrically connect the respective common connecting port to the respective first connecting port in a first switching state and to electrically connect the respective common connecting port to the respective second connecting port in a second switching state,
the common connecting port of the first switching circuit being electrically connected to the at least one first antenna and the common connecting port of the second switching circuit being electrically connected to the at least one second antenna,
the first connecting port of the first switching circuit being electrically connected to the common connecting port of the first frequency division unit and wherein the first connecting port of the second switching circuit being electrically connected to the common connecting port of the second frequency division unit,
the second connecting port of the first switching circuit being electrically connected to the second connecting port of the second switching circuit thereby forming the bypass line,
the control unit being electrically connected to the first and second switching circuit and configured to control the first and second switching circuits in such a way that the first and second switching circuits switch to the respective first switching state or to the respective second switching state.

4. The signal booster device of claim 3, wherein the first limit value is set to such a value that the bypass line is enabled:
before the uplink and downlink noise power exceeds −70 dBm/MHz and the uplink gain exceeds the lesser of 23 dB or MSCL (mobile station coupling loss), wherein MSCL is the minimum coupling loss between the mobile and an input port of the signal booster device the at least one first antenna is connected to; and/or
if a gain of a signal between the first connecting ports of the first and second switching circuits is smaller than a gain of a signal between the second connecting ports of the first and second switching circuits.

5. The signal booster device of claim 3, wherein the control unit is configured to control the first and second switching circuits in such a way that the first and second switching circuits switch to their respective first switching state if the measurement value of the at least one first downlink power detector falls below a second limit value so that the signal booster device is operated in a normal operation mode.

6. The signal booster device of claim 5, wherein the second limit value is:
as high as the first limit value; or
is below the first limit value.

7. The signal booster device of claim 5, wherein
the control unit is configured to control the first and second switching circuits during the bypass mode in such a way that the first and second switching circuits periodically switch between the second switching state and the first switching state, and
the control unit is further configured to obtain the measurement value from the at least one first downlink power detector in the first switching state.

8. The signal booster device of claim 7, wherein the control unit is configured to control the first and second switching circuits during the bypass mode in such a way that the first and second switching circuits remain longer than 10-times or 20-times or 50-times or 100-times or 200-times or 500-times or 1000-times or 2000-times or 5000-times or 7000-times or 10000-times in the second switching state than in the first switching state.

9. The signal booster device of claim 8, wherein the first switching state lasts longer than 50 µs, 60 µs, 70 µs, 80 µs, 90 µs, 100 µs, 120 µs, 140 µs, 160 µs, 180 µs or 200 µs but less than 500 µs, 400 µs, 300 µs, 200 µs or 150 µs.

10. The signal booster device of claim 7, wherein the control unit is further configured to control the at least one first attenuator during the bypass mode in such a way that the at least one first attenuator is driven at least during the first switching state to at least 70% or 80% or 90% of its maximum attenuation.

11. The signal booster device of claim 5, wherein
the signal booster device comprises a second downlink power detector for detecting a downlink signal power in the bypass line, and
the control unit is also configured to obtain a measurement value from the second downlink power detector wherein the control unit is configured to control the first and second switching circuits during the bypass mode with respect to the measurement value obtained from the second downlink power detector.

12. The signal booster device of claim 3, wherein
the signal booster device comprises at least one first attenuator,
the at least one first attenuator is arranged between the first connecting ports of the first and second switching circuits, and
the control unit is configured to control the attenuation factor of the at least one first attenuator.

13. The signal booster device of claim 12, wherein
the at least one first attenuator is arranged between the first connecting port of the first switching circuit and the common connecting port of the first frequency division unit, and/or
the at least one first attenuator is arranged between the first connecting port of the second switching circuit and the common connecting port of the second frequency division unit.

14. The signal booster device of claim 12, wherein
each of the at least one downlink and uplink amplifier is configured to operate at a constant gain, and
the control unit is configured to control the attenuation factor of the least one first attenuator to maintain the output of the signal booster device at the at least one second antenna within the limits required by standards of the cellular industry.

15. The signal booster device of claim 14, wherein
the control unit is configured to control the attenuation factor of the least one first attenuator so that an uplink gain does not exceed −34 dB—RSSI+MSCL at a donor port the at least one second antenna is connected to, wherein
RSSI is the downlink composite received signal strength in dBm at the donor port and
MSCL is the minimum coupling loss between the mobile and an input port of the signal booster device the at least one first antenna is connected to.

16. The signal booster device of claim 3, wherein the first and the second switching circuits are SPDT (single pole double throw) semiconductor elements.

17. The signal booster device of claim 2, wherein
the at least one first downlink power detector is arranged in the first downlink path between the first frequency division unit and the at least one downlink amplifier, and/or
the at least one first downlink power detector is arranged in the first downlink path between the second frequency division unit and the at least one downlink amplifier, and/or
the signal booster device comprises at least one first uplink power detector for detecting an uplink signal power, wherein the at least one first uplink power detector is arranged in the first uplink path and wherein the control unit is configured to obtain a measurement value from the at least one first uplink power detector.

18. The signal booster device of claim 2, wherein
the signal booster device is configured to transmit different signals corresponding to at least two different mobile communication bands over the first uplink signal path between the first and second frequency division units,
the signal booster device further comprises a first and a second uplink matching network arranged within the first uplink signal path,
the first uplink matching network is connected to the first frequency division unit and is configured to split the first uplink signal path into at least two uplink branches wherein the first uplink matching network is further configured to forward each of the two mobile communication bands in a different branch,
the second uplink matching network is connected to the second frequency division unit and is configured to merge the at least two uplink branches back into the first uplink signal path,
at least one other uplink amplifier is arranged in each of the at least two uplink branches and is configured to amplify the communication signal of the respective communication band transmitted over the respective uplink branch.

19. The signal booster device of claim 18, wherein at least one other uplink power detector is arranged in each of the at least two uplink branches before and/or after the respective at least one other uplink amplifier, wherein the control unit is configured to obtain a measurement value from the at least one other uplink power detector in each of the at least two uplink branches.

20. The signal booster device of claim 2, wherein the first part of the signal path is also split up into a second downlink signal path and into a second uplink signal path by the first frequency division unit, wherein:
the second downlink signal path is connected to the second downlink port of the first frequency division unit and wherein the second uplink signal path is connected to the second uplink port of the first frequency division unit;
the second part of the signal path is split up into a second downlink signal path and into a second uplink signal path by the second frequency division unit, wherein the second downlink signal path is connected to the second downlink port of the second frequency division unit and wherein the second uplink signal path is connected to the second uplink port of the second frequency division unit;
the first uplink and the first downlink paths are used for transmitting in a low band comprising different mobile communication bands, and
the second uplink and the second downlink paths are used for transmitting in a high band comprising different mobile communication bands.

21. The signal booster device of claim 20, wherein the low band comprises different mobile communication bands below 1000 MHz or below 1200 MHz or below 1400 MHz and wherein:
the high band comprises different mobile communication bands above 1000 MHz or above 1200 MHz or above 1400 MHz, and/or
the low band comprises the mobile communication bands 5, 12, 13, 17 and wherein the high band comprises the mobile communication bands 2, 4.

22. The signal booster device of claim 20, wherein the first downlink signal path and the second downlink signal path are partly merged into a single electrical line, and the at least one downlink amplifier is arranged within the single electrical line.

23. The signal booster device of claim 2, wherein:
the signal booster device is configured to receive signals corresponding to at least two different mobile communication bands over the first downlink signal path,
the signal booster device further comprises a first and a second downlink matching network arranged within the first downlink signal path,
the second downlink matching network is connected to the second frequency division unit and is configured to split the first downlink signal path into at least two downlink branches, wherein the second downlink matching network is further configured to forward each of the at least two mobile communication bands in a different branch, the first downlink matching network is connected to the first frequency division unit or to the at least one downlink amplifier and wherein the first downlink matching network is configured to merge the at least two downlink branches back into the first downlink signal path, and at least one other downlink amplifier is arranged in each of the at least two downlink branches and is configured to amplify the communication signal of the respective communication band received over the respective downlink branch.

24. The signal booster device of claim 23, wherein at least one other downlink power detector is arranged in each of the at least two downlink branches before and/or after the respective at least one other downlink amplifier, and the control unit is configured to obtain a measurement value from the at least one other downlink power detector in each of the at least two downlink branches.

25. The signal booster device of claim 1, wherein the at least one downlink amplifier and/or the at least one uplink amplifier are low noise amplifiers (LNA).

26. The signal booster device of claim 1, wherein the signal is a 2G, 3G, 4G and/or 5G signal.

27. A transportation platform such as a vehicle, a ship, a train or a plane, wherein the transportation platform comprises a signal booster device according to claim 1, the at least one first antenna is arranged within the transportation platform and the at least one second antenna is arranged on the outside of the transportation platform.

28. A method for amplifying signals in a signal booster device of the type comprising:

at least one first antenna for communicating with a mobile and at least one second antenna for communicating with a base station, a signal path for electrically connecting the at least one first antenna to the at least one second antenna for transmitting uplink and downlink signals, at least one downlink amplifier for amplifying a downlink signal and at least one uplink amplifier for amplifying an uplink signal, at least one first downlink power detector for detecting a downlink signal power, a bypass line for directly electrically connecting the at least one first antenna to the at least one second antenna, a control unit configured to obtain a measurement value from the at least one first downlink power detector, the control unit being configured to enable the bypass line, the method comprising the following steps for amplifying signals:

obtaining a measurement value from the at least one first downlink power detector, determining whether the measurement value of the at least one first downlink power detector oversteps a first limit value, and switching from normal operation mode into bypass mode if the measurement value of the at least one first downlink power detector oversteps the first limit value, thereby electrically disconnecting the at least one downlink amplifier and the at least one uplink amplifier from the respective at least one first antenna and at least one second antenna.

* * * * *